(12) United States Patent
Kakei (10) Patent No.: US 7,997,800 B2
(45) Date of Patent: Aug. 16, 2011

(54) LINEAR MOTION GUIDE UNIT WITH MOUNTING PLATE

(75) Inventor: Shigeki Kakei, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 450 days.

(21) Appl. No.: 12/195,715

(22) Filed: Aug. 21, 2008

(65) Prior Publication Data
US 2009/0052815 A1 Feb. 26, 2009

(30) Foreign Application Priority Data
Aug. 21, 2007 (JP) ................................ 2007-214823

(51) Int. Cl.
*F16C 29/06* (2006.01)
(52) U.S. Cl. .......................................... 384/15; 384/45
(58) Field of Classification Search .............. 384/43–45, 384/13, 15
See application file for complete search history.

(56) References Cited

U.S. PATENT DOCUMENTS

| 5,634,722 | A  | * | 6/1997  | Yuasa et al. ..................... 384/15 |
| 5,775,813 | A  | * | 7/1998  | Saitoh .............................. 384/15 |
| 6,296,413 | B1 | * | 10/2001 | McCann et al. ................. 384/15 |
| 7,717,621 | B2 | * | 5/2010  | Kakei et al. ..................... 384/15 |
| 7,740,406 | B2 | * | 6/2010  | Kakei .............................. 384/15 |

FOREIGN PATENT DOCUMENTS
JP 09-317765 12/1997
* cited by examiner

*Primary Examiner* — Thomas R Hannon
(74) *Attorney, Agent, or Firm* — Browdy and Neimark, PLLC (57) ABSTRACT

A mounting plate is used to install any optional accoutrements or attachment on a linear motion guide unit. The mounting plate is made of a molded product which is inexpensive in production cost and easier in its accurate conjunction with a slider to get the attachment bringing out the best in function. The mounting plate is made to have surfaces opposite to each other, one of which is a first mounting surface inward coming into mating with the one end surface of the slider and another is a second mounting surface outward coming into mating with the attachment. The mounting plate is made of a molded product. The mounting plate is made of an injected mold product of synthetic resin which is composed of a major part of synthetic resin and a metal core centrally embedded in the major part.

10 Claims, 8 Drawing Sheets

LINEAR MOTION GUIDE UNIT WITH MOUNTING PLATE

FIELD OF THE INVENTION

The present invention relates to a linear motion guide unit with mounting plate befitted to machinery including assembling machines, conveyers, semiconductor fabricating equipment, and material-removing equipment such as cutting machines, grinding machines, woodcutting machines, and so on, which are needed to operate in severe working environment where much foreign materials including chips, debris, dirt, dusts, and so on occur or any liquid including processing fluids, and so on splashes.

BACKGROUND OF THE INVENTION

The linear motion guide units are increasingly needed in years to have greater improvements in function and get more befitted to work in tough operating environment by addition of optional accoutrements or attachments including dustproof means to prevent foreign material from invading through ends of a slider, highly hermetical seals, lubricators to apply lubricant to the slider, and so on. Especially, the advanced technology in recent years needs the linear motion guide unit adapted for use in machine tools including cutting machines, grinding machines, woodcutting machines, and so on, which operate in harsh working environment where much foreign materials including chips, debris, dirt, dusts, and so on occur or any liquid including processing fluids and so on splashes.

In the commonly-assigned Japanese Laid-Open Patent Application H09-317 765, there is disclosed a linear motion guide unit with a mounting plate to fasten an additional seal on an outward surface of an end seal of a slider to improve the sealing function. The mounting plate is made up of a ceiling portion and sidewise opposite wing portions extending downwards from the widthwise opposite ends of the ceiling portion. The sidewise opposite wing portions have locating pins to locate precisely the additional seal relatively to the slider. Moreover, the mounting plate has holes into which fastening screws fit to secure the mounting plate onto the slider and further has tapped holes into which threaded screws fit to hold a scraper plate or sealing member thereon. The mounting plate also serves as a spacer.

However, the mounting plate used in the prior linear motion guide unit constructed as stated just earlier, because of machined out of a steel blank uniquely to every linear motion guide unit, has required considerable effort in processing steps and expense in production thereof. Moreover, the prior mounting plate functions only as a spacer to provide a mounting surface at a location around a lip part protruding above the outward end surface of the end seal and therefore may be relatively moderate in accuracy.

Meanwhile, the linear motion guide units finding increased application are especially required meeting with the maintenance-free operation for lubrication and high-accuracy working even with high functional burden, further keeping running cost and maintenance cost for long-lasting service life reasonable. The majority of modern linear motion guide unit is the roller type more preferable in stiffness and accuracy. The advanced technology is in need of the linear motion guide unit that is not only able to operate better in worse working environment, but also more refined in function with the slider being mounted at the end surface thereof with any optional ancillary including dustproof means to prevent foreign material from invading through ends of a slider, highly hermetical seals, lubricators to apply lubricant to the slider, and so on. To this end, although there is provided a mounting plate to retain the accoutrements on the slider, the mounting plate is desired to be easier and steadier in its installation on the slider and also high in accuracy and less in production cost. On the other hand, the linear motion guide units, since finding in years diverse applications in machine tools and so on used in tough working environment, are required to stand up to the harshest conditions where much foreign materials including chips, debris, dirt, dusts, and so on occur or any liquid including processing fluids, and so on splashes.

SUMMARY OF THE INVENTION

The present invention has for its primary object to overcome the major challenge as stated earlier in the linear motion guide unit used in the machinery such as a machine tool and the like which is used in tough working environment where much foreign materials occur. More particular, the present invention is intended to be the provision of the linear motion guide unit with a mounting plate including attachment plate, butt plate, joint plate, and so on, which fits on the end surface of the slider to keep in place the accoutrements including dustproof means to prevent foreign material from invading through ends of a slider, highly hermetical seals, lubricators to apply lubricant to the slider, and so on. The present invention also provides a mounting plate installed on the linear motion guide unit, which is designed to keep the accoutrements better in their intrinsic functions, easier in installation to the end surface of the slider with high accuracy and simple in fabrication with less cost.

The present invention is concerned with a linear motion guide unit; comprising an elongated guide rail having a first raceway surface on a side thereof extending in a lengthwise direction of the guide rail, a slider fitting over and conforming to the guide rail to move lengthwise of the elongated guide rail in a sliding manner by virtue of more than one rolling element, and an attachment installed on any one of lengthwise opposite end surfaces of the slider through a mounting plate;

wherein the mounting plate is made flat having even surfaces opposite to each other, one of which is a first mounting surface inward coming into mating with the one end surface of the slider and another is a second mounting surface outward coming into mating with the attachment; and wherein the mounting plate is made of a molded product.

In one aspect of the present invention, a linear motion guide unit is disclosed in which the molded product of the mounting plate is made of an injected mold of synthetic resin in which a metal core is embedded centrally in a synthetic resin major part.

In another aspect of the present invention, a linear motion guide unit is disclosed in which the first mounting surface inward of the mounting plate is secured to the one end surface of the slider by a first fastening bolt tightened against the metal core while the attachment is secured to the second mounting surface outward of the mounting plate by a second fastening bolt tightened against the metal core. In another aspect of the present invention, there is disclosed a linear motion guide unit in which the major part is counterbored on the second end surface outward of the mounting plate so as to fit over a bolt head of the first fastening bolt in a fashion the bolt head reaches the metal core, and wherein the major part is made with a hexagonal counterbore on the first end surface inward of the mounting plate so as to fit over a nut mating with the second fastening bolt in a fashion the nut reaches a the metal core. In a further another aspect of the present invention, a linear motion guide unit is disclosed in which the metal core of the mounting plate is made therein with four first holes allowing the first fastening bolts extending through there, and four second holes allowing the second fastening bolts extending through there.

In another aspect of the present invention, a linear motion guide unit is disclosed in which the attachment includes a dustproof means and a scraper to exclude the foreign materials, the dustproof means being composed of a cassette and a dustproof seal to keep the foreign materials out of the slider, the scraper being installed on an outward end surface of the cassette, and wherein the mounting plate is formed to have an inside edge to hug around the guide rail as close as possible to the guide rail to exclude the foreign materials from entering or remaining inside the slider. In a further another aspect of the present invention, there is disclosed a linear motion guide unit in which the dustproof seal in the dustproof means is composed of a spongy layer impregnated with lubricant and flanked by skins of rubber.

In another aspect of the present invention, a linear motion guide unit is disclosed in which the mounting plate is recessed to have the inside edge to fit over or conform around the guide rail, the inside edge of the major part being made raised in opposition to the first raceway surface on the guide rail while the metal core having no raised portion towards the first raceway surface on the guide rail in parallel to the major part.

In another aspect of the present invention, a linear motion guide unit is disclosed in which the slider is composed of a carriage having thereon a second raceway surface in opposition to the first raceway surface of the guide rail to define a load-carrying race between them and having therein a return passage extending in parallel with the load-carrying race, end caps secured to lengthwise opposite ends of the carriage, one to each end, and made therein with turnaround passages joining the load-carrying race and the return passage together with one another, end seals lying on outward end surfaces of the end caps to close clearances left between the guide rail and the end caps, and more than one rolling element allowed to roll through a circulating circuit made up of the load-carrying race, return passage and the turnaround passages.

In another aspect of the present invention, a linear motion guide unit is disclosed in which the end seals each have a lip raised above the end seal and the mounting plate has a recess made to fit over the lip of the end seal, and wherein the mounting plate has a raised portion on the inward mounting surface thereof to fit into a counterbore made in an outward end surface of the end seal.

In a further another aspect of the present invention, a linear motion guide unit is disclosed in which the attachment is installed to come into close engagement with the associated mounting plate over throughout their surfaces confronted with each other.

With the linear motion guide unit constructed as stated earlier, the mounting plate used to install the optional accoutrements or attachment to the slider is made of the molded product of synthetic resin having the metal core embedded therein can be made simple in construction and less in production cost, compared with the prior mounting plate. Moreover, the mounting is better in conjunction of the attachment to the slider with steadiness and ease and also made plate can be made superior in stiffness and accuracy.

DETAILED DESCRIPTION OF THE PREFERRED EMBODIMENTS

The linear motion guide unit constructed according to the present invention is used incorporated between the relatively sliding parts in machinery including machine tools, assembling machines, conveyors, semiconductor fabricating equipment, and so on. Especially, the linear motion guide unit of the present invention is provided at forward and aft ends of a slider thereof with mounting plates, which are refined to make it easier to install optional accoutrements or attachments including dustproof means, lubricators, and so on with accuracy to improve the linear motion guide unit in functions most befitted for working environment. Moreover, the linear motion guide unit of the present invention is of the type using more than one roller, which is usually used in the machinery as stated earlier under the tough working conditions where much foreign materials occur. As an alternative, the linear motion guide unit of the present invention can be likewise applied to another type using more than one ball as a rolling element and also a guide shaft instead of the guide rail.

A preferred embodiment of the linear motion guide unit according to the present invention has more than one roller as a rolling element and further has optional accoutrements or attachments at forward and aft ends of slider. There are provided mounting plates less in weight and in production cost to make it easier to install the attachments on the ends of the slider with accuracy. The linear motion guide unit of the present invention is especially directed to further development of the mounting plate disclosed in the commonly-owned senior Japanese Patent Application as recited earlier. The mounting plate of the present invention is composed of a metal core and synthetic resin enveloping the metal core, and designed to be rich in stiffness although inexpensive in production cost. The mounting plate of the present invention has the constructional feature making it possible to install easily the optional attachments including dustproof means, lubricators, and so on with accuracy and steadiness.

Figure 1:
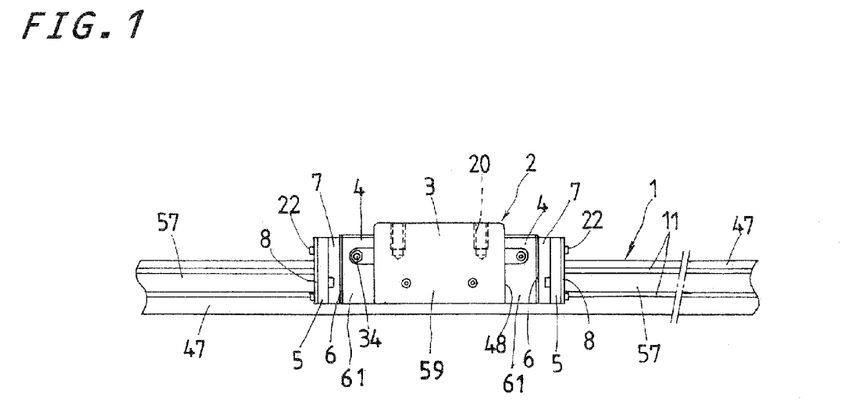
FIG. 1 is a view in front elevation illustrating a preferred embodiment of a linear motion guide unit according to the present invention.
Figure 2:
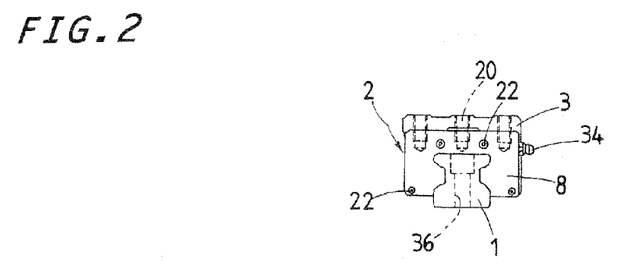
FIG. 2 is a view in side elevation of the linear motion guide unit of FIG. 1.
Figure 3:
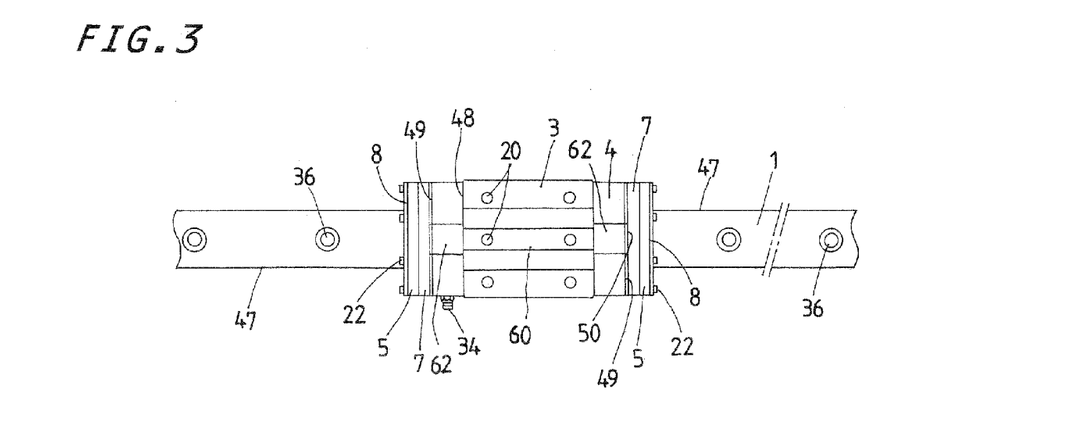
FIG. 3 is a view in plan of the linear motion guide unit of FIG. 1.

Referring now in detail to the drawings, the linear motion guide unit according to the present invention will be explained below. The linear motion guide unit as shown in FIGS. 1 to 3 is mainly comprised of an elongated guide rail 1 made on each lengthwise side 47 thereof with a pair of raceway surfaces 11 or first raceway surfaces, and a slider 2 that fits over or conforms to the guide rail 1 in a way moving relatively to the guide rail 1 by virtue of more than one cylinder or roller (not shown). The slider 2 is mainly composed of a carriage 3 made thereon with raceway surfaces or second raceway surfaces (not shown) extending in opposition to the raceway surfaces 11 on the guide rail 1 to define load-carrying races (not shown) between opposite first raceway surfaces 11 and the second raceway surfaces and further made therein with return passages (not shown) extending in parallel with the load-carrying races, forward and aft end caps 4 disposed on lengthwise opposing end faces 48 of the carriage 3 and further made therein with turnaround passages to join the load-carrying races to their associated return passages, respectively, forward and aft end seals 6 secured on outward surfaces 49 of the end caps 4 to seal clearances left between the guide rail 1 and the slider 2, and more than one roller allowed to roll through a circulating circuit made up of the load-carrying race, return passage and paired turnaround passages.

The linear motion guide unit of the present invention especially features that an attachment 10 including a dustproof means and a scraper is secured on an outward surface 50 of the end seal 6 through a mounting plate 7 of synthetic resin, which is fabricated by injection molding process.

With the linear motion guide unit, the guide rail 1 is made therein with bolt holes 36 at regular intervals, which are used to fasten the guide rail 1 to a stationary base or machine bed, and the like. On the other hand, the carriage 3 is made with threaded holes 20 that are used to hold any other component to the carriage 3. With the linear motion guide units in which the rollers roll through the load-carrying races between the raceway surfaces 11 with experiencing heavy loads, it is inevitable to continue the positive application of lubricant including grease and lubricating oil to keep the rollers against metal-to-metal contact that might otherwise cause abnormal wear and scuffing. The end caps 4 are each made at either both sides or end surface thereof with a lubrication port to feed the application into the circulating circuit for the rollers. A grease nipple 34 joins any of the lubrication ports. The carriage 3 is made up of widthwise opposing bulgy sides 59 extending fore and aft along the sides 47 of the guide rail 1 and a top portion 60 straddling across the guide rail 1 to connect the widthwise opposing bulgy sides 59 with each other. Likewise the carriage 3, the end caps 4 are each made of widthwise opposing bulgy sides 61 parallel to the bulgy sides 59 of the carriage 3 and a top portion 62 corresponding to the top portion 59 of the carriage 3 to straddle across the guide rail 1 to connect the widthwise opposing bulgy sides 61 with each other.

Sometimes the linear motion guide units are needed to have mounted on the outward surface 50 of the end cap 4 with any attachment 10 available as option. The mounting plate 7 is intended to get fit onto the outward surface 50 of the end cap 4 in the slider 2 to install any optional attachment 10 on the slider 2. The attachment 10 is optionally added or mounted to the slider 2 to give the linear motion guide units extra functions in conformity with particular working environment or the severe working environment in which there are generated many foreign materials of the kinds as stated earlier. With the preferred embodiment explained here, the attachment 10 includes the dustproof means 5 and the scraper 8, which are most befitted for the incorporation into the machine tools including cutting machines, grinding machine, woodworking machines and so on in which foreign materials including chips, debris, dirt, dusts, processing fluids, coolants and so on are much caused. As an alternative, the attachment 10 is made to have a lubricating means 51 to feed the slider 2 with lubricant as stated later with reference to FIG. 18, instead of the dustproof means 5.

Figure 4:
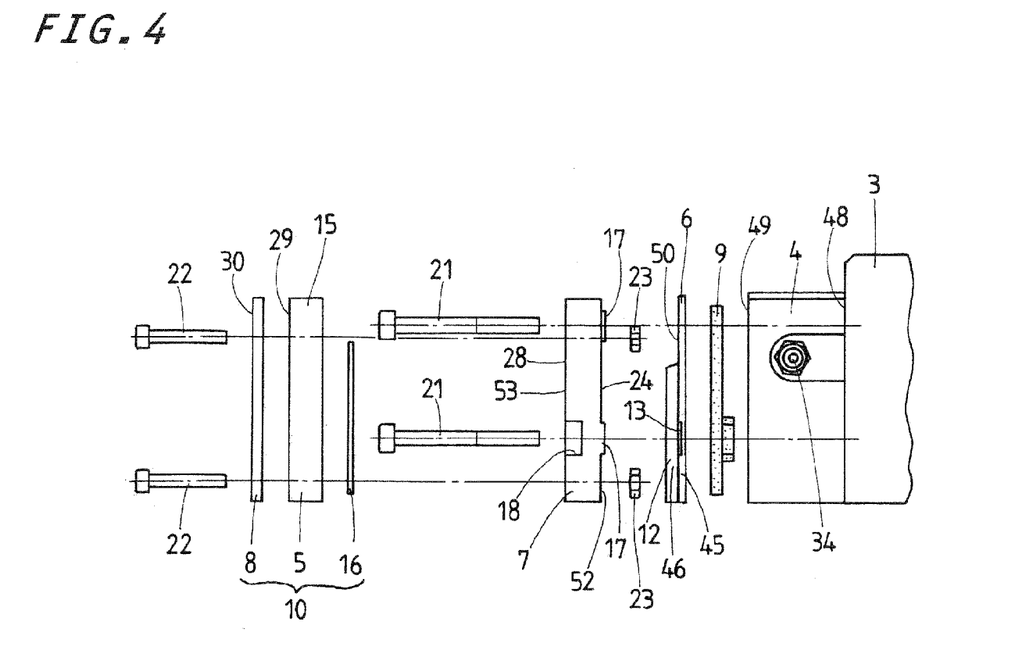
FIG. 4 is an exploded view illustrating one end of a slider in the linear motion guide unit of FIG. 1.
Figure 5:
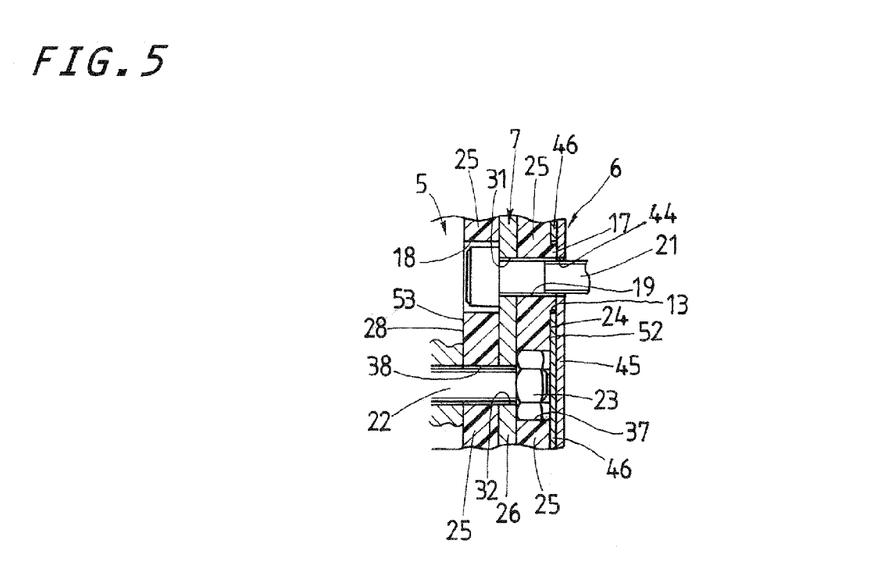
FIG. 5 is a fragmentary view in transverse section illustrating about how a mounting plate of FIG. 4 is assembled into the slider.
Figure 6:
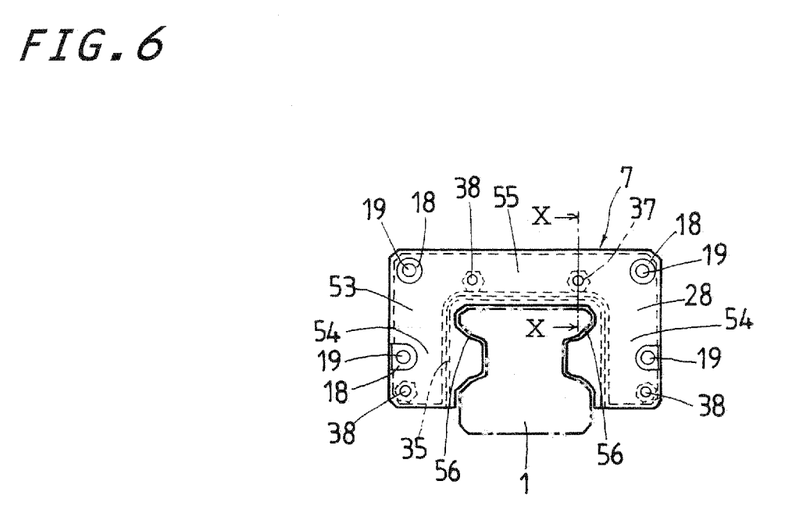
FIG. 6 is a view in front elevation of the mounting plate of FIG. 4.
Figure 14:
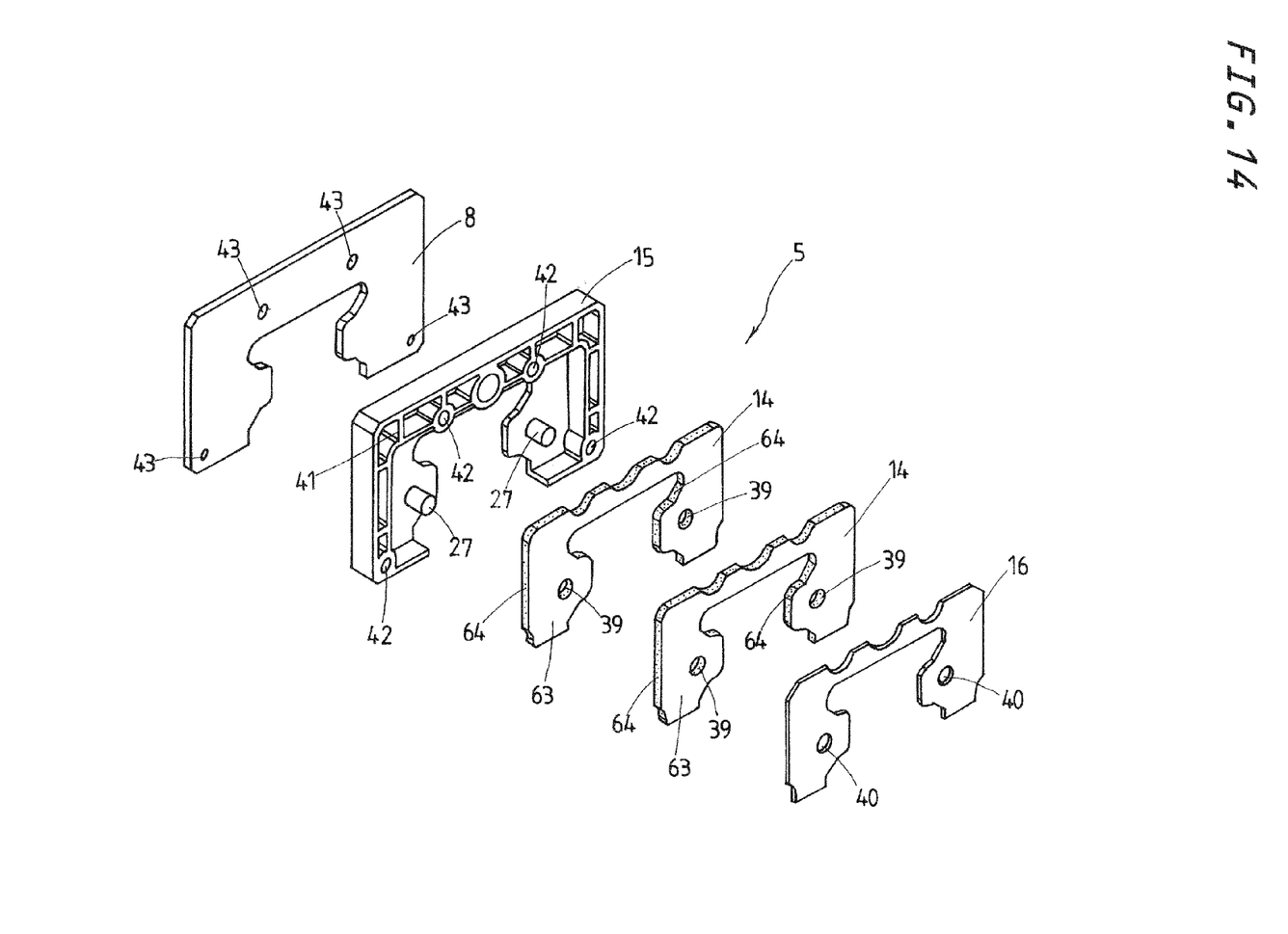
FIG. 14 is an exploded view in perspective showing an attachment of FIG. 4.

Still referring to FIGS. 4 and 5, there is shown the linear motion guide unit in which a lubricant-impregnated member 9 fits into a recess sunk below the outward surface 49 of the end cap 4 to realize the maintenance-free operation for lubrication. The mounting plate 7 is placed in a geometry an inward end surface 24 thereof faces the outward surface 50 of the associated end seal 6, and secured to the carriage 3 together with the end seal 6 and the end cap 4 by means of first fastening bolts 21 that extend past both the end seal 6 and the end cap 4 into the carriage 3. The attachment 10 is installed on another end surface or outward end surface 28 of the mounting plate 7 with second fastening bolts 22. The attachment 10 as shown in detail in FIG. 14 is made up of the dustproof means 5 of a cassette 15 and the scraper 8 lying on an outward end surface 29 of the cassette 15. The cassette has accommodated therein a pair of dustproof seals and gets closed with a closure sheet 16. The second fastening bolts 22 are applied on an outward end surface 30 of the scraper 8 to stretch past the scraper 8 and the dustproof means 5, mating with nuts 23 in the mounting plate 7 to tighten the attachment 10 against the mounting plate 7.

The mounting plate 7 as shown in detail in FIGS. 6 to 13 is constituted with a major part 25 of flat configuration made of synthetic resin product and a metal core 26 embedded in the major part 25 at the time of injection molding of synthetic resin. The major part has a first mounting surface 52 to come into mating with the outward surface 50 of the end seal 6 and a second mounting surface 53 to secure the attachment 10 thereon. That is, the mounting plate 7 is made of a composite product fabricated by injection molding in a fashion that the metal core 26 is embedded inside the major part 25 of synthetic resin. Thus, the mounting plate 7 is light in weight, accurate in dimension, withstanding against corrosion and less in production cost. The metal core 26 is made therein with perforations 31 to allow the first fastening bolts 21 extending through across the metal core 26 and also other perforations 32 for the second fastening bolts 22. The mounting plate 7 constructed as stated just earlier is proved steady in better accuracy, conformable to sophisticated configuration, and snugly applicable to the outward end surface 50 of the slider 2.

Like the slider 2 having sidewise bulgy portions 50, the mounting plate 7 is also composed of widthwise opposing bulgy sides 54 lying in opposition to the sides 47 of the guide rail 1 and a top portion 55 straddling across the guide rail 1 to connect the widthwise opposing bulgy sides 54 with each other, making an inverted U-shape recess to fit over or conform to the guide rail 1. An inside edge of the mounting plate 7 around the guide rail 1 is made to hug the guide rail 1 in a way leaving throughout a slight clearance between them.

Figure 12:
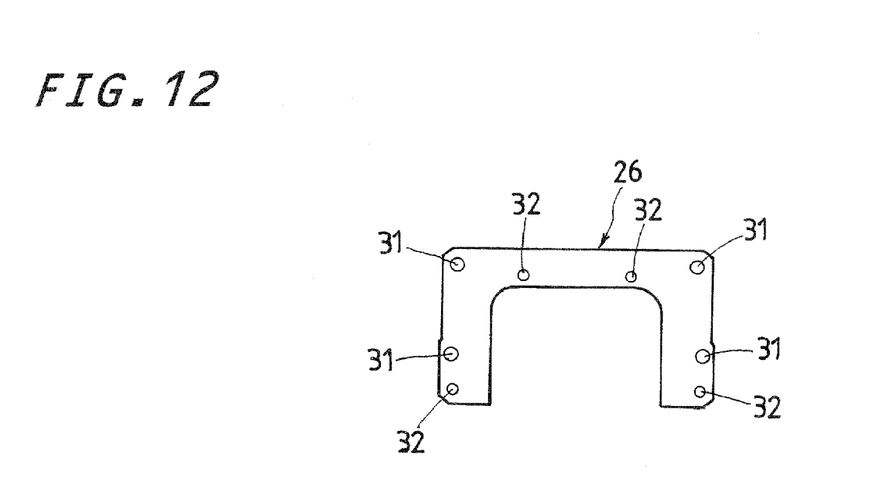
FIG. 12 is a view in front elevation showing a metal core to be embedded inside the mounting plate of FIG. 6.
Figure 13:
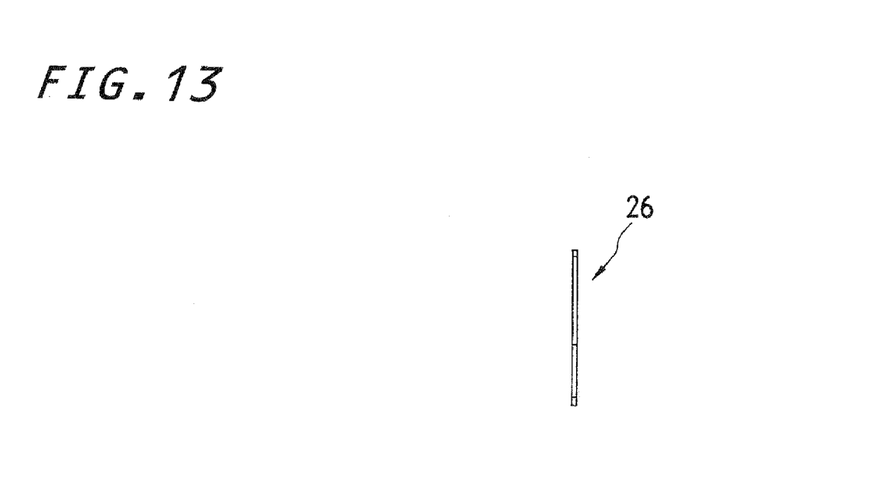
FIG. 13 is a view in side elevation of the metal core of FIG. 12.

That is, the inside edge of the mounting plate 7 is made raised at 33 towards a rail web 57 between the raceway surfaces 11 on the guide rail 1 to hug throughout the contour of the guide rail 1 as close as possible to the guide rail 1. The metal core 26 embedded in the synthetic resin-made major part 25 of the mounting plate is designed as shown in FIGS. 12 and 13. Unlike the major part 25, the metal core 26 is made of a thin sheet of a simple U-shaped configuration with no raised portion like the raised portion 33 in the major part 25. The metal core 26, because of no raised portion, helps the injected synthetic resin flow evenly from a sprue at the raised portion into a mold cavity to entirely encapsulate the metal core 26 inside the major part 25.

On the outward end surface 28 of the mounting plate 7 or the second mounting surface 53 of the major part 25 to come into face-to-face contact with any attachment, there are made four counterbores 18 near the corners of the major part 25 to accommodate a bolt head of the first bolt 21 therein with no prominence above the second mounting surface 53. The counterbores 18 each reach deep so as to leave no synthetic resin at the bottom, exposing the metal core 26. On the other hand, there are made other four holes 32, 38 near the corners of the major part 25 to allow the second fastening bolts 22 extending across the mounting plate 7. The holes for the second fastening bolts 22 different from the counterbores 18 in location are counterbored on the opposite side to the counterbores 18 for the first fastening bolts 21. On the inward end surface 28 of the mounting plate 7 or the first mounting surface 52 of the major part 25 to come into face-to-face contact with the end seal 6, there are made four counterbores 37 near the corners of the major part 25 to accommodate entirely both a nut 23 and an extremity of the second fastening bolt 22 mating with the nut 23 therein with no prominence above the first mounting surface 52.

Figure 7:
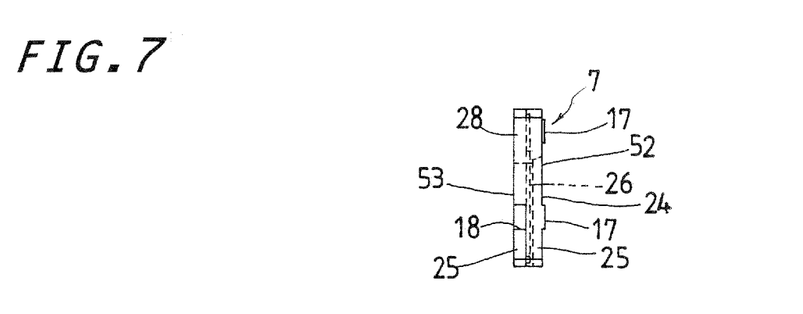
FIG. 7 is a view in side elevation of the mounting plate of FIG. 6.
Figure 8:
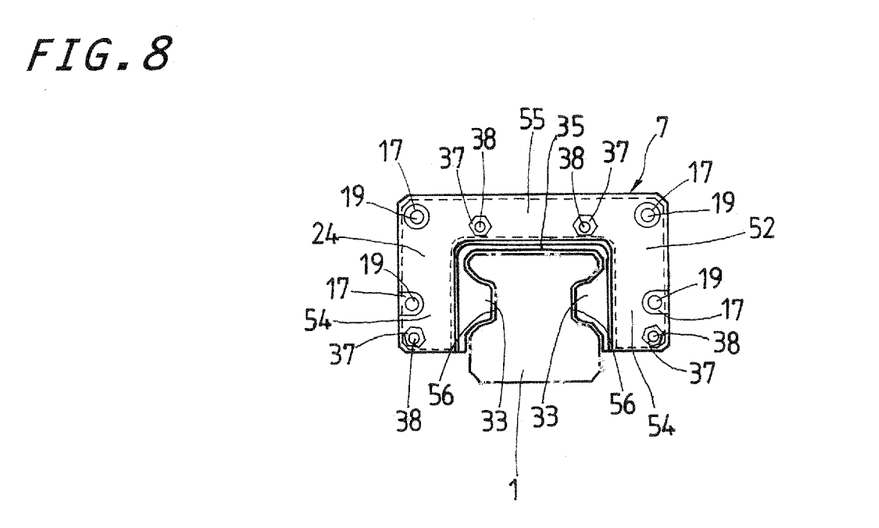
FIG. 8 is a view in rear elevation of the mounting plate of FIG. 6.
Figure 9:
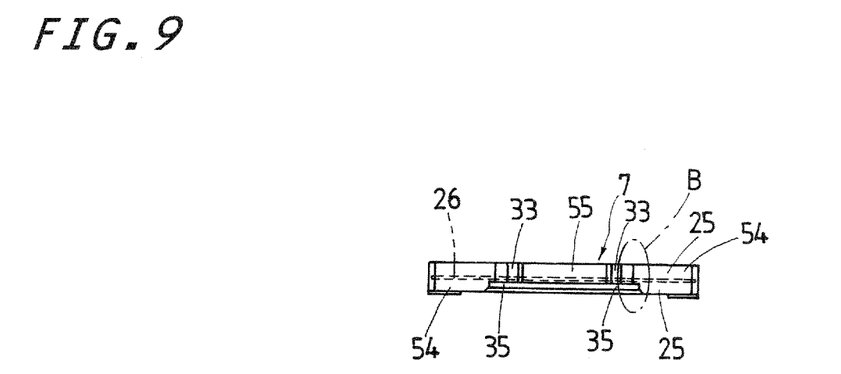
FIG. 9 is a view in bottom elevation of the mounting plate of FIG. 6.
Figure 10:
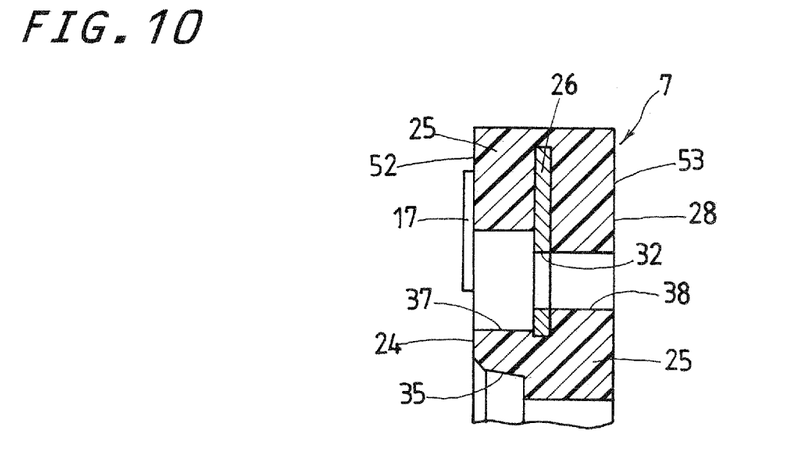
FIG. 10 is a fragmentary view in transverse section of the mounting plate of FIG. 6, the view being taken on the plane of the line X-X of that figure.
Figure 11:
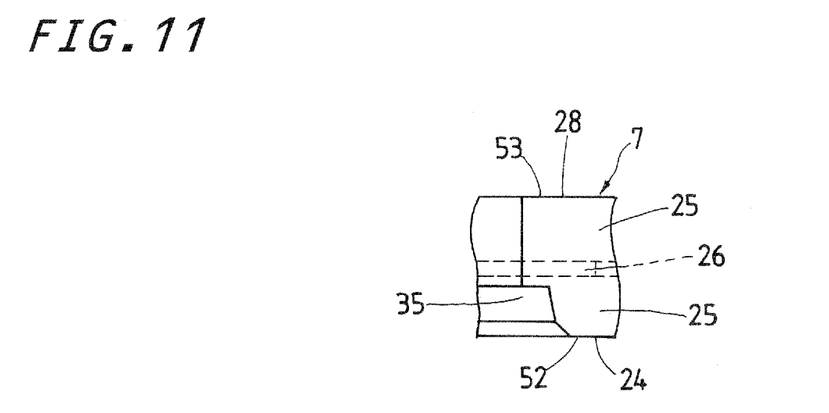
FIG. 11 is an enlarged fragmentary view showing in detail a particular portion encircled with a sign B in the mounting plate of FIG. 9.

On the inward end surface 24 or first mounting surface 52 of the mounting plate 7 lying in opposition to the outward end surface 50 of the end seal 6, as shown in FIGS. 7 and 8, there are made annular ridges 17 that are each raised slightly above the first mounting surface 52 around a hole 19 that permits the first fastening bolt 21 to pass through there, while the holes made in the end seal 6 for the first fastening bolts 21 are each enlarged on the outward end surface 50 of the end seal 6 to make counterbores 13 (refer to FIG. 15), which are intended to fit over their associated annular ridges 17 (refer to FIG. 4) to make it easier to locate the mounting plate 7 with respect to the associated end seal 6. Both the major part 25 and metal core 26 of the mounting plate 7 are made therein with the holes 32 and 38, respectively, which are in alignment with each other to allow the second fastening bolts 22 extending through there. The mounting plate 7 has a recess 35 made in a way hugging the inside edge 24 of the mounting plate 7 in conformity with contour in transverse section of the guide rail 1 to come into mating with a lip 12 raised above the end seal 6 to keep the inward end surface 24 of the mounting plate 7 in close-contact with the associated end seal 6.

The end seal 6 is constituted with a metal core 45 and a coat 46 of synthetic rubber adhered to the metal core 45. The counterbore 13 is made to reach deep so as to leave no synthetic rubber at the bottom, exposing the metal core 45. With the counterbore 13 made as stated earlier, the annular ridge 17 raised above the mounting plate 7 is allowed to fit into the associated counterbore 13 to come into direct engagement with the metal core 45. This means that the mounting plate 7, even after the first fastening bolt has been tightened, is prevented from getting warped because of elasticity of the synthetic rubber, secured with steadiness on the outward end surface 50 of the end seal 6. On the inward end surface or the first mounting surface 24 of the mounting plate 7 in the linear motion guide unit of the present invention, as shown in FIG. 8, there are made the hexagonal counterbores 37 in alignment with the holes 38 for the second fastening bolts 22. The nuts 23 mating with their associated second fastening bolts 22 are nested snugly in the hexagonal counterbores 37 with no prominence above the first mounting surface 52. The hexagonal counterbores 37 are made so deep as to leave no synthetic resin at the bottom, thereby exposing the metal core 26.

With the linear motion guide unit of the present invention, the mounting plate 7 is made on the inward surface 24 thereof with the recess 35 concaved below the first mounting surface 52 in conformity with the inverted U-shape of the guide rail 1 to fit over the lip 12 of the end seal 6 out of touch with the lip 12 to leave a slight clearance between them. With the mounting plate 7 constructed as stated earlier, the first fastening bolts 21 as shown in FIG. 5 are tightened in a way their seating or bearing surfaces come into face-to-face engagement with the metal core 26 while the nuts 23 mating with the second fastening bolts 22 are squeezed in a way their seating or bearing surfaces come into face-to-face engagement with the metal core 26. Thus, the elastic deformability inherent in the molding of synthetic resin can be left out of consideration to make sure of accurate fastening of the mounting plate 7. The mounting plate 7 once assembled with the linear motion guide unit, moreover, is kept in a fashion that the inside edge thereof is out of touch with the guide rail 1 to leave only a slight clearance 56 between them. Thus, the mounting plate 7 is effective to exclude any foreign materials including chips, debris, dirt, dusts, cutting fluids and so on from entering or remaining inside the slider 2.

The attachment 10 shown in FIG. 14 is composed of the dustproof means 5 and the scraper 8, and befitted for use in the linear motion guide unit needed to operate in the severe working environment in which much foreign materials occur. The scraper 8 is made of a thin sheet of steel, which are placed at the outermost end of the slider 2 and made concaved to have an inside edge hugging the guide rail 1 in a way out of touch with the guide rail 1 to leave a slight clearance between them to exclude relatively massive foreign materials.

The dustproof means 5 includes the cassette 15 having an outward end surface 29 to keep the scraper 8 thereon, a pair of dustproof seals 14 taken in the cassette 15 to exclude foreign materials, and the closure sheet 16 to hold firmly the dustproof seals 14 inside the cassette 15, which has torsionally stiff ribs 41 arranged to surround the dustproof seals 14. In the stiff ribs 41, there are made holes 42 for the second fastening bolts 22. Locating pins 27 raised above the inward surface opposite to the outward surface 29 of the cassette 15 are intended to keep the dustproof seals 14 in such place that the dustproof seals 14 come into sliding contact with the guide rail 1. The dustproof seals 14 are each composed of rubber-made skins 63 and a spongy intermediate 64 sandwiched between the skins 63 and impregnated with lubricant. With the construction as stated earlier, the dustproof seals 14 are effective to exclude foreign materials and rich in durability.

Figure 15:
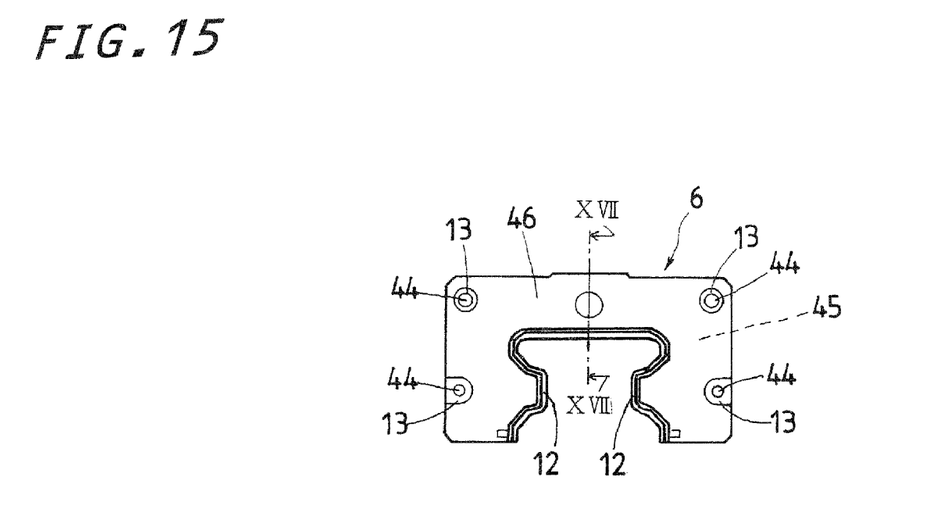
FIG. 15 is a view in front elevation showing an end seal of FIG. 4.
Figure 16:
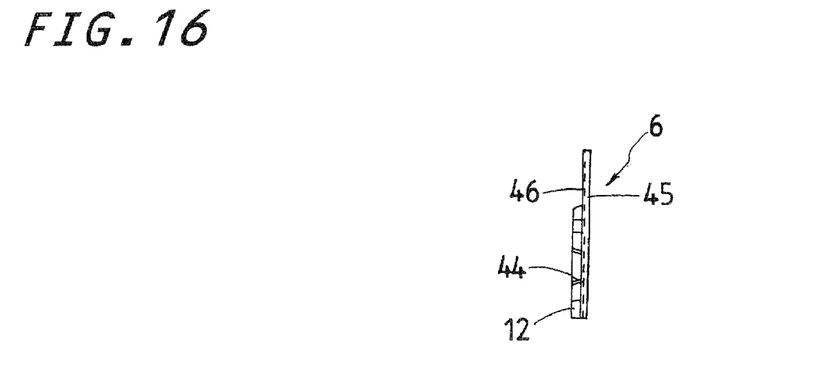
FIG. 16 is a view in side elevation showing an end seal of FIG. 4.
Figure 17:
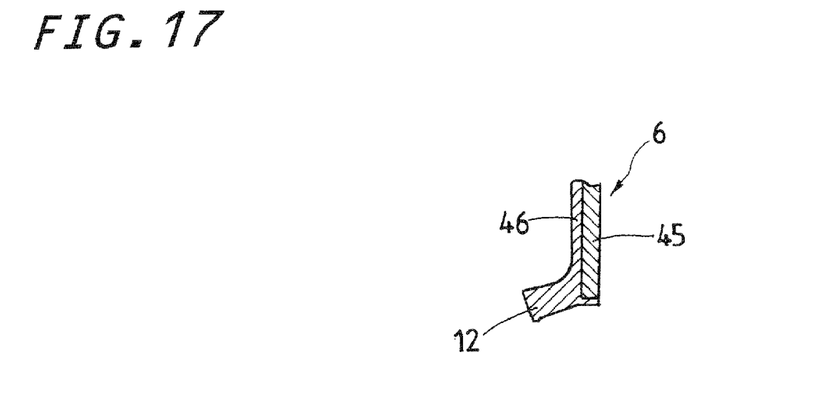
FIG. 17 is a fragmentary view in section of the end seal of FIG. 15, the view being taken on the plane of the line XVII-XVII of that figure.

The end seal 6 as shown in FIGS. 15 to 17 is made up of the metal core 45 of steel and the coat 46 of synthetic rubber baked on the metal core 45. The rubber coat 46 is made with a lip 12 to make sliding engagement with the guide rail 1. The coat 46 is made of a thin sheet of rubber adhered on the outward end surface of the metal core 45 to cover almost entire outward surface. The lip 12 outward to exclude foreign materials is formed along the inside edge of the end seal 6 in a fashion protruding obliquely from the outward surface of the coat 46 towards the guide rail 1. The counterbore 13 leading to the hole 44 for the fastening bolt 21 is made to reach deep so as to leave no synthetic rubber at the bottom, thereby exposing the metal core 45. With the counterbore 13 made as stated earlier, the fastening bolt 21 makes certain of secure tightening of the mounting plate 7 against the slider 2 in close engagement with the associated end seal 6.

Figure 18:
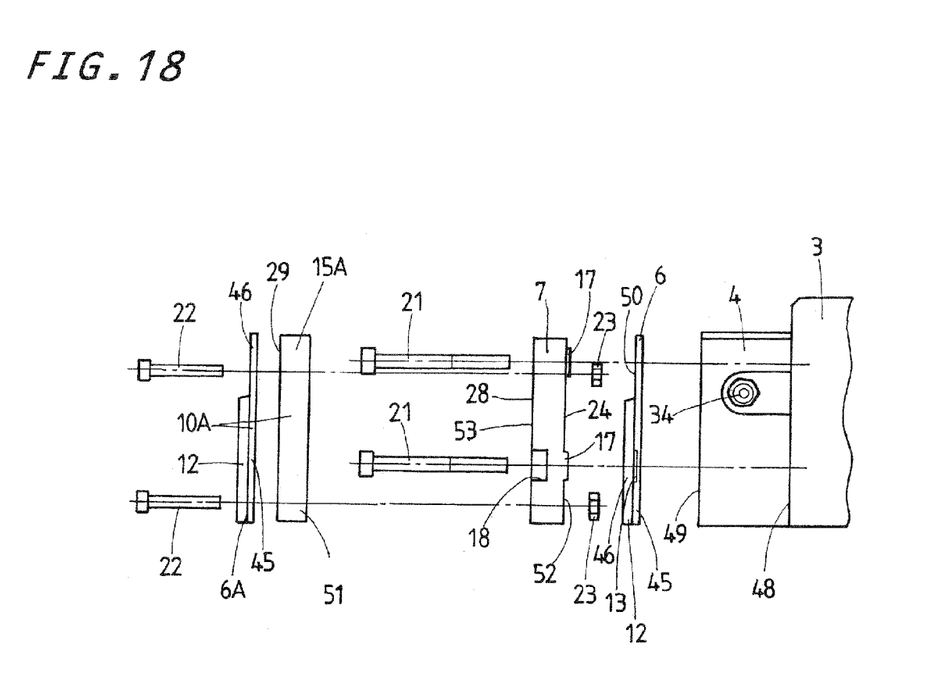
FIG. 18 is a view in front elevation showing an end seal of FIG. 4.

Referring to FIG. 18, there is shown a second version of the linear motion guide unit equipped with an attachment 10A having a lubricating mean 51 therein. With the second version, the attachment 10A includes the lubricating means 51 having mounted with a second end seal 6A at the foremost end surface thereof. The provision of the lubricating means 51 in the second version makes it possible to exclude the lubricant impregnated member 9 from the outward end surface 49 of the end cap 4 in the first embodiment as stated earlier. The lubricating means 51 also has a lubricant impregnated member as same as the lubricant impregnated member 9 in the first embodiment. The lubricant impregnated member is contained inside a cassette 15A to come into sliding engagement with the raceway surfaces 11 on the guide rail 1 to apply lubricant to the raceway surfaces 11 on the guide rail 1. The second end seal 6A is made as same as the end seal 6 in construction. The second end seal 6A serves to exclude foreign materials including dirt and the like from entry the raceway surfaces 11 on the guide rail 1 and has therein holes, not shown, through which the second fastening bolts 22 extend to secure the end seal 6A on the lubricating means 51.

What is claimed is:

1. A linear motion guide unit; comprising an elongated guide rail having a first raceway surface on a side thereof extending in a lengthwise direction of the guide rail, a slider fitting over and conforming to the guide rail to move lengthwise of the elongated guide rail in a sliding manner by virtue of more than one rolling element, and an attachment installed on any one of lengthwise opposite end surfaces of the slider through a mounting plate;

wherein the mounting plate is made flat having even surfaces opposite to each other, one of which is a first mounting surface inward coming into mating with the one end surface of the slider and another is a second mounting surface outward coming into mating with the attachment;

wherein the mounting plate is made of a molded product, and wherein the molded product of the mounting plate is made of an injected mold of synthetic resin in which a metal core is embedded centrally in a synthetic resin major part.

2. A linear motion guide unit constructed as defined in claim 1, wherein the first mounting surface of the mounting plate is secured to the one end surface of the slider by a first fastening bolt tightened against the metal core while the attachment is secured to the second mounting surface of the mounting plate by a second fastening bolt tightened against the metal core.

3. A linear motion guide unit constructed as defined in claim 2, wherein the major part is counterbored on the second end surface outward of the mounting plate so as to fit over a bolt head of the first fastening bolt in a fashion the bolt head reaches the metal core, and wherein the major part is made with a hexagonal counterbore on the first end surface inward of the mounting plate so as to fit over a nut mating with the second fastening bolt in a fashion the nut reaches a the metal core.

4. A linear motion guide unit constructed as defined in claim 3, wherein the metal core of the mounting plate is made therein with four first holes allowing the first fastening bolts extending through there, and four second holes allowing the second fastening bolts extending through there.

5. A linear motion guide unit constructed as defined in claim 1, wherein the attachment includes a dustproof means and a scraper to exclude the foreign materials, the dustproof means being composed of a cassette and a dustproof seal to keep the foreign materials out of the slider, the scraper being installed on an outward end surface of the cassette, and wherein the mounting plate is formed to have an inside edge to hug around the guide rail as close as possible to the guide rail to exclude the foreign materials from entering or remaining inside the slider.

6. A linear motion guide unit constructed as defined in claim 5, wherein the dustproof seal in the dustproof means is composed of a spongy layer impregnated with lubricant and flanked by skins of rubber.

7. A linear motion guide unit constructed as defined in claim 5, wherein the mounting plate is recessed to have the inside edge to fit over or conform around the guide rail, the inside edge of the major part being made raised in opposition to the first raceway surface on the guide rail while the metal core having no raised portion towards the first raceway surface on the guide rail in parallel to the major part.

8. A linear motion guide unit constructed as defined in claim 1, wherein the slider is composed of a carriage having thereon a second raceway surface in opposition to the first raceway surface of the guide rail to define a load-carrying race between them and having therein a return passage extending in parallel with the load-carrying race, end caps secured to lengthwise opposite ends of the carriage, one to each end, and made therein with turnaround passages joining the load-carrying race and the return passage together with one another, end seals lying on outward end surfaces of the end caps to close clearances left between the guide rail and the end caps, and more than one rolling element allowed to roll through a circulating circuit made up of the load-carrying race, return passage and the turnaround passages.

9. A linear motion guide unit constructed as defined in claim 8, wherein the end seals each have a lip raised above the end seal and the mounting plate has a recess made to fit over the lip of the end seal, and wherein the mounting plate has a raised portion on the inward mounting surface thereof to fit into a counterbore made in an outward end surface of the end seal.

10. A linear motion guide unit constructed as defined in claim 8, wherein the attachment is installed to come into close engagement with the associated mounting plate over throughout their surfaces confronted with each other.

* * * * *